United States Patent
Mueller et al.

(10) Patent No.: US 11,314,482 B2
(45) Date of Patent: Apr. 26, 2022

(54) LOW LATENCY FLOATING-POINT DIVISION OPERATIONS

(71) Applicant: International Business Machines Corporation, Armonk, NY (US)

(72) Inventors: Silvia Melitta Mueller, Altdorf (DE); Thomas Winters Fox, Hopewell Junction, NY (US); Bruce Fleischer, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 16/684,081

(22) Filed: Nov. 14, 2019

(65) Prior Publication Data

US 2021/0149633 A1    May 20, 2021

(51) Int. Cl.
    *G06F 7/487*    (2006.01)
    *G06F 7/499*    (2006.01)

(52) U.S. Cl.
    CPC ........ *G06F 7/4873* (2013.01); *G06F 7/49947* (2013.01)

(58) Field of Classification Search
    CPC ......... G06F 7/4873; G06F 7/535–5375; G06F 2207/5355–5356
    See application file for complete search history.

(56) References Cited

U.S. PATENT DOCUMENTS

| | | | | |
|---|---|---|---|---|
| 5,249,149 A * | 9/1993 | Cocanougher | ........ | G06F 7/535 708/504 |
| 5,377,134 A * | 12/1994 | Faget | ........ | G06F 7/535 708/650 |
| 5,751,619 A | 5/1998 | Agarwal et al. | | |
| 8,667,044 B1 * | 3/2014 | Old | ........ | G06F 7/535 708/654 |
| 2006/0179092 A1 * | 8/2006 | Schmookler | ........ | G06F 7/535 708/204 |
| 2009/0216824 A1 * | 8/2009 | Weinberg | ........ | G06F 7/535 708/504 |
| 2012/0011185 A1 | 1/2012 | Mohamed et al. | | |
| 2016/0110161 A1 * | 4/2016 | Lutz | ........ | G06F 7/483 708/502 |
| 2016/0313976 A1 * | 10/2016 | Dibrino | ........ | G06F 7/52 |
| 2017/0010863 A1 | 1/2017 | Nystad | | |
| 2017/0017467 A1 | 1/2017 | Sexton | | |

FOREIGN PATENT DOCUMENTS

WO    2017196204 A1    11/2017

* cited by examiner

*Primary Examiner* — Matthew D Sandifer
(74) *Attorney, Agent, or Firm* — Scully, Scott, Murphy & Presser, P.C.; Daniel P. Morris

(57) ABSTRACT

Methods and systems for division operation are described. A processor can initialize an estimated quotient between the dividend and the divisor separately from a floating-point unit (FPU) pipeline. The processor can implement the FPU pipeline to execute a refinement process that can include at least a first iteration of operations and a second iteration of operations. The refinement process can include, in the first iteration of operations, generating a first unnormalized floating-point value using the initialized estimated quotient. The refinement process can include, in the second iteration of operations, generating a second unnormalized floating-point value using the first unnormalized floating-point value. The processor can determine a final quotient based on the second unnormalized floating-point value.

20 Claims, 10 Drawing Sheets

| $Z_{Final}$ | $Z^*_{Final}$ $\delta = -3/4 ulp$ | $Z'_{Final}$ $\beta = 1/4 ulp$ | $Z'_{Final} * b$ | Round | Result $Z$ |
|---|---|---|---|---|---|
| (1) | V-ulp | V | < a<br>= a<br>> a | $Z^*_{Final}$+ulp<br>$Z^*_{Final}$+ulp<br>$Z^*_{Final}$+0 | V<br>V<br>V-ulp |
| (2), (3) | V-ulp | V | <, =, > a | $Z^*_{Final}$+ulp | V |
| (4) | V | V+ulp | < a<br>= a<br>> a | $Z^*_{Final}$+ulp<br>$Z^*_{Final}$+ulp<br>$Z^*_{Final}$+0 | V+ulp<br>V+ulp<br>V |

| $Z_{Final}$ | $Z^*_{Final}$ $\delta = 1/4 ulp$ | $Z'_{Final}$ $\beta = 1/4 ulp$ | $Z'_{Final} * b$ | Round | Result $Z$ |
|---|---|---|---|---|---|
| (1) | V | V | < a<br>= a<br>> a | $Z^*_{Final} + ulp$<br>$Z^*_{Final} + 0$<br>$Z^*_{Final} + 0$ | V+ulp<br>V<br>V |
| (2), (3) | V | V | <, =, > a | $Z^*_{Final} + ulp$ | V+ulp |
| (4) | V+ulp | V+ulp | < a<br>= a<br>> a | $Z^*_{Final} + ulp$<br>$Z^*_{Final} + 0$<br>$Z^*_{Final} + 0$ | V+2ulp<br>V+ulp<br>V+ulp |

| $Z_{Final}$ | $Z^*_{Final}\ \delta=0$ | $Z'_{Final}\ \beta=0$ | $Z'_{Final}*b$ | Round | Result Z |
|---|---|---|---|---|---|
| (1) | V | V+1/2ulp | >, =, < a | $Z^*_{Final}+0$ | V |
| (2) | V | | < a | $Z^*_{Final}+ulp$ | V+ulp |
| (3) | V | | = a | $Z^*_{Final}+inc$ | V* |
|     |   |   | > a | $Z^*_{Final}+0$ | V |
| (4) | V | | <, =, > a | $Z^*_{Final}+ulp$ | V+ulp |

LOW LATENCY FLOATING-POINT DIVISION OPERATIONS

BACKGROUND

The present disclosure relates in general to processors, and more specifically, to processors that implement floating-point arithmetic operations.

Floating-point division operations can induce delay in operation restarts and latency in a pipeline. For example, a floating-point division operation can include a pre-processing stage to initialize operands, a processing or refinement stage to iteratively estimate and/or refine a quotient, where each estimation depends on an estimation from a previous iteration, and a post-processing stage such as normalizing, rounding, checking, and packing results from the processing stage. Such operations can occupy a relatively high number of cycles in the pipeline, thus inducing undesirable latency and delays in restart of various operations.

SUMMARY

In some examples, a system of performing floating-point division is generally described. The system can include a memory and a processor. The processor can be configured to be in communication with the memory. The processor can be configured to initialize an estimated quotient between a dividend and a divisor. The processor can be further configured to execute a refinement process to refine the estimated quotient in a floating-point unit (FPU) pipeline. The FPU pipeline can include at least a first iteration of operations and a second iteration of operations. The refinement process can include, in the first iteration of operations, generating a first unnormalized floating-point value using the initialized estimated quotient. The refinement process can include, in the second iteration of operations, generating a second unnormalized floating-point value using the first unnormalized floating-point value. The processor can be further configured to determine a final quotient based on the second unnormalized floating-point value.

In some examples, a computer-implemented method for performing floating-point division is generally described. The method can include initializing, by a processor, an estimated quotient between a dividend and a divisor. The method can further include executing, by the processor, a refinement process to refine the estimated quotient in a floating-point unit (FPU) pipeline. The FPU pipeline can include at least a first iteration of operations and a second iteration of operations. The refinement process can include, in the first iteration of operations, generating, by the processor, a first unnormalized floating-point value using the initialized estimated quotient. The refinement process can further include, in the second iteration of operations, generating, by the processor, a second unnormalized floating-point value using the first unnormalized floating-point value. The method can further include determining, by the processor, a final quotient between the dividend and the divisor based on the second unnormalized floating-point value.

In some examples, a system of performing floating-point division is generally described. The system can include a memory and a processor. The processor can be configured to be in communication with the memory. The processor can be configured to initialize an estimated quotient between a dividend and a divisor. The processor can be further configured to execute a refinement process to refine the estimated quotient in a floating-point unit (FPU) pipeline. The processor can be further configured to determine a final quotient based on an outcome of the refinement process.

In some examples, a computer program product for performing floating-point division is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3C illustrates example results of an implementation of the example system of FIG. 1 in one embodiment.

FIG. 3D illustrates example results of an implementation of the example system of FIG. 1 in one embodiment.

FIG. 3E illustrates example results of an implementation of the example system of FIG. 1 in one embodiment.

DETAILED DESCRIPTION

Figure 1:
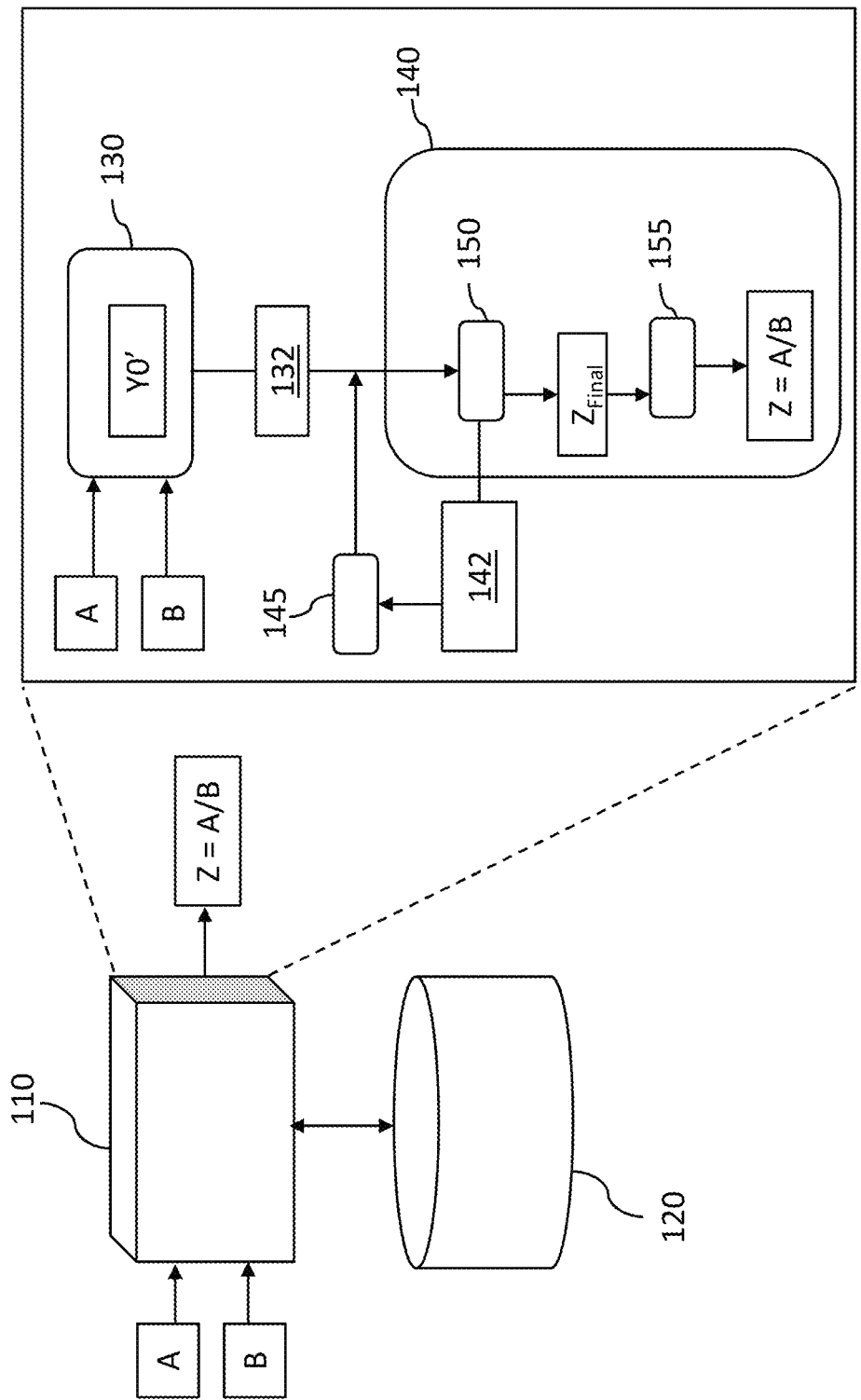
FIG. 1 is a diagram showing an example computer system that can implement low latency floating-point division operations in one embodiment.

In an example, floating-point division operations can be performed through sequences of various arithmetic operations such as addition, subtraction, and multiplication. A hardware processor can implement fused multiply add (FMA) based floating-point units (FPU) to perform these arithmetic operations. In an example, to perform a division operation (e.g., a dividend divided by a divisor), the hardware processor can implement circuits and components in addition to the FPU to perform a pre-processing stage, such as determining an estimated reciprocal of the divisor, where the estimated reciprocal is an input to the FPU. The FPU can perform a processing stage, which includes performing iterations of arithmetic operations on the estimated reciprocal to refine and estimate a quotient of the dividend and the divisor. The FPU can output an estimated quotient determined at a final iteration to another circuit to perform post-processing operations to generate a final quotient of the division. In some examples, post-processing operations can include normalizing, rounding, and packing the output from the final iteration to generate the final quotient. In some examples, the processing stage can be performed in an FPU pipeline, the pre-processing stage and the post-processing stage can be performed separately from the FPU pipeline. The FPU pipeline can allow overlapping execution of multiple instructions using the same circuits. To be described in more detail below, the methods and systems described in accordance with the present disclosure provides various embodiments that can reduce a number of instructions being executed in the FPU pipeline in division operations.

In an example, under the Newton-Raphson (NR) division scheme, the processing stage to perform a division operation Z=A/B (where X is a quotient, A is a dividend, and B is a divisor) can include the following flow of operations (that can be implemented by a processor) shown in Table 1:

TABLE 1

| 1. | b = norm(B) | |
|---|---|---|
| 2. | Y0 = fre(b) | |
| 3. | E0 = 1 − Y0*B | |
| 4. | Q0 = Y0*A | |
| 5. | e1 = E0*E0 | // extra mantissa bits |
| 6. | Q1 = Q0 + Q0*E0 | |
| 7. | q2 = Q1 + Q1*e1 | // extra mantissa bits |

In Table 1, uppercase variables such as A, B, Y0, E0 can be floating-point numbers in IEEE 754 standard format, and lowercase variables such as b and e1 can be intermediate values or values internal to processor logic, which may not use the IEEE 754 standard format. In some examples, these intermediate values may have more or less precision when compared to their counterpart (e.g., uppercase) variables and may or may not have a different number of exponent bits from their counterpart (e.g., uppercase) variables. Note that the format of variable b, which does not use the IEEE 754 standard format, allows b to be a normalized number even if its counterpart variable B is unnormalized. The operation fre( ) can be a floating-point reciprocal estimate instruction, or a reciprocal lookup operation. The steps of b=norm(B) and Y0=fre(b) (lines 1 and 2) can be parts of the pre-processing stage, which can be separate from an FPU pipeline. The operations from lines 3-7 can be performed in an FPU pipeline. For example, lines 3-4 can be performed in a first iteration of the FPU pipeline and lines 5-6 can be performed in a second iteration of the FPU pipeline, where operations at lines 5-6 use the results from the first iteration. The variable q2 can be the final estimated quotient that can undergo the post-processing stage, which can be outside of the FPU pipeline, to yield final quotient Z. Note that the parameter Q can be initialized as Q0, then Q0 can be further refined into Q1 (normalized), q2 (unnormalized), to better approximate the final quotient Z. Similarly, the parameter E, which can be an error associated with a corresponding value of Q, can be initialized as E0, then refined into e1 (unnormalized), to minimize an error of the final quotient Z. A goal of the refinement of parameter Q is for Q to converge towards A/B, and a goal of the refinement of parameter E is for E to converge to zero.

In another example, under the Anderson Earle Goldschmidt Powers (AEGP) division scheme, the processing stage to perform the division operation Z=A/B, can include the following flow of operations (that can be implemented by a processor) shown in Table 2:

TABLE 2

| 1. | b = norm(B) |
|---|---|
| 2. | a = norm(A) |
| 3. | Y0 = fre(b) |
| 4. | D1 = Y0*b |
| 5. | X1 = Y0*a |
| 6. | D2 = D1*(2−D1) |
| 7. | X2 = X1*(2−D1) |
| 8. | d3 = D2*(2−D2) |
| 9. | x3 = X2*(2−D2) |

In Table 2, uppercase variables such as Y0, D1, X1, D2, X2 can be floating-point numbers in IEEE 754 standard format, and lowercase variables such as b, a, d3, x3 can be intermediate values or values internal to processor logic, which may not use the IEEE 754 standard format. Note that the format of variables b and a may not be the IEEE 754 standard format, which allows variables b and a to be normalized numbers even if their counterpart variables B and A are denormalized, respectively. The operation fre( ) can be a floating-point reciprocal estimate instruction. The variable d3 can be an intermediate or internal value with two more mantissa bits when compared to the IEEE 754 standard format. The variable x3 can also include extra mantissa bits. The steps of b=norm(B), a=norm(A), and Y0=fre(b) (lines 1-3) can be parts of the pre-processing stage, which can be separate from the FPU pipeline. The operations from lines 4-9 can be performed in an FPU pipeline. For example, lines 4-5 can be performed in a first iteration of the FPU pipeline and lines 6-7 can be performed in a second iteration of the FPU pipeline, where operations at lines 6-7 use the results from the first iteration. The variable x3 can be the final estimated quotient that can undergo the post-processing stage described above to yield final quotient Q. Note that the parameter D under the AEGP division scheme can be initialized as D1, then D1 can be further refined into D2, d3, to better approximate the final quotient Q. Similarly, the parameter X, which can be a parameter that can be used to determine an error associated with a corresponding value of D, can be initialized as X1, then refined into X2, x3, to minimize an error of the final quotient Q.

The final estimated quotients (q2 in the NR division scheme, and x3 in the AEGP division scheme), can be unnormalized floating-point numbers (e.g., floating-point values whose mantissas, with implied bit, do not fall within the half-closed interval [1.0, 2.0)). For example, a normalized mantissa is 1.011 and an unnormalized mantissa is 0.001011. A normalizer (e.g., a circuit) can be used to normalize these unnormalized results (e.g., shift an arbitrary number of bits to the left until a value of 1 appears before the radix point), but normalization can use one cycle of the division or FPU pipeline per iteration. For example, in Table 1, Y0, E0, E1 can be normalized numbers resulting from normalization of the values y0, e0, e1, respectively. To be described in more detail below, the methods and systems in accordance with the present disclosure adds a feedback loop to send the unnormalized results through a circuit that is operable to define or select a fixed number of bits to shift the unnormalized results, and use the fixed shifted results as an input to a next iteration. Thus, instruction cycles being used to perform normalization can be reduced since intermediate unnormalized results are adjusted using a circuit to perform the fixed shifts. For example, under the NR division scheme in Table 1, the variables Y0, E0, E1, can be replaced by unnormalized numbers y0, e0, e1. In another example, under the AEGP division scheme in Table 2, the normalized numbers Di, 2-Di, and Xi (where i=1, 2) can be replaced by unnormalized numbers di, 2-di, and xi, respectively.

In an example, the determination of the estimated reciprocal Y0=fre(b) includes 1) shifting B by a number of bits (b=norm(B)), 2) applying an offset function on a subset of bits b'', where b'' can be bits among the mantissa of b, 3) determining a slope of b'', 4) determining partial products, which can be products of the slope and b' (another subset of bits among b), 5) inputting the partial products to a carry-save adder (CSA) to compress the partial products to sum bits (denoted as sy) and carry bits (denoted as cy), and 6) input sy and cy into another adder to generate Y0. To be described in more detail below, the methods and systems in accordance with the present disclosure inputs sy and cy into another CSA, instead of the adder at step 6), to insert some zeros into sy and cy, resulting in coefficients sy' and cy'. Then, sy' and cy' can be inputted into a Booth recoder to generate a value Y0'. Y0' can be multiplied with the dividend A, to generate Q0 in the NR division scheme and to generate X1 in the AEGP division scheme, and Y0' can be multiplied with divisor B to generate D1 in the AEGP division scheme and to facilitate generation of E0 in the NR division scheme. In other words, instead of performing the operations to generate Q0 and E0 under the NR division scheme, or to generate D1 and X1 under the AEGP division scheme, during the processing stage, these operations can be separated from the FPU pipeline and absorbed into the pre-processing stage, thus reducing instruction cycles needed to perform the division.

In an example, the final estimated quotient can undergo a post-processing stage that includes performing a back multiplication check on a product between the final estimated quotient and the divisor B against the dividend A. The back multiplication check can facilitate a determination of an error (e.g., difference between the product and A). Further, rounding can be performed on the final estimated quotient to remove excess bits. The rounding can include incrementing or decrementing the final estimated quotient based on a unit in the last place (ulp) of the final estimated quotient. To be described in more detail below, the methods and systems in accordance with the present disclosure uses results of a back multiplication check to identify a correction or rounding term to be added to the final estimated quotient, and round the final estimated quotient with the added rounding term to obtain the final quotient that has an error of less than ¼ ulp.

FIG. 1 is a diagram showing an example computer system 100 that can implement low latency floating-point division in one embodiment. The system 100 can include a processor 110 and a memory 120 configured to be in communication with each other. The processor 110 can be, for example, a microprocessor, a special purpose processor, a processing core of a multi-core processor, a central processing unit of a computer device, and/or other types of hardware processor operable to execute instructions. The processor 110 can include various processing units, modules, registers, buffers, memories, and other components. For example, as shown in FIG. 1, the processor 110 can include a circuit 130, a floating-point processor or unit (FPU) 140, and a circuit 145 that may be configured to be in communication with each other. The FPU 140 can be a processor that includes a plurality of components, such as an arithmetic unit 150 and a post-processing unit or processor 155.

The circuit 130 can include a lookup table circuit operable to identify or determine values, such as an estimated reciprocal of a divisor. For example, the processor 110 can receive a request to perform a division of A/B, where A is the dividend and B is the divisor. The circuit 130 can include, for example, logic gates that can be implemented to generate an output, such as Y0' described above, instead of Y0 in the NR and AEGP division schemes shown in Table 1 and Table 2, respectively. The value Y0' can include two coefficients, a sum component denoted as sy' and a carry component denoted as cy', that can be used to initialize the parameters 132 (initialized parameters 132), which can be Q0, E0 in the NR division scheme or D1, X1 in the AEGP division scheme). The circuit 130 can multiply the value Y0' with the divisor B to initialize parameter D or Q, generating D1 or Q0, respectively. Similarly, the circuit 130 can multiply value Y0' with the dividend A to initialize the parameter X or E, generating X1 or E0, respectively.

The circuit 130 can output the initialized parameters 132 to the FPU 140. The FPU 140 can refine the parameters 132 by performing at least one iteration of arithmetic operations in an FPU pipeline. For example, if the processor 110 is configured to implement the NR division scheme, the FPU 140 can use E0 among initialized parameters 132 to determine e1, and can use Q0 among initialized parameters 132 to determine Q1. If the processor 110 is configured to implement the AEGP division scheme, the FPU 140 can use D1 among initialized parameters 132 to determine D2, and can use X1 among initialized parameters 132 to determine X2.

In an example, note that in Table 1, Y0, E0, E1 are normalized values corresponding to unnormalized values y0, e0, e1 (intermediate values 142), respectively. For example, Y0=norm(y0), such that y0=fre(b), or the fre( ) includes a normalization step, to yield Y0. Intermediate values 142 can be unnormalized floating-point values or numbers that can be inputted into a circuit 145. The circuit 145 can be operable to perform a fixed shift on the intermediate values 142, such as adjusting exponent bits of the intermediate values 142 to shift the intermediate values 142 by a predefined number of digits or bits to remove leading zeros. Fixed shifted results 146 output from circuit 145 can be used as inputs to a next iteration, without going through normalization prior to the next iteration of operations. For example, instead of using E0 to performing the operation e1=E0*E0, the FPU 140 can input intermediate value e0 to the circuit 145, where the circuit 145 can perform a fixed shift on e0 to generate e0', and the FPU 140 can perform e1=e0'*e0'.

The functions of the circuit 145 can be dependent on the division scheme being implemented by the processor 110. In examples where the processor 110 is configured to implement the NR division scheme, the circuit 145 can include a multiplexer (MUX) operable to select a fixed number of zeros or shift positions to shift an unnormalized value. Under the NR division scheme, the unnormalized value y0 can be at least 14-bit accurate, which leads to the unnormalized value of e0 having at least fourteen leading zeros, and the unnormalized value of e1 having at least twenty-eight leading zeros. Thus, the circuit 145 can include a 3-to-1 multiplexer that can receive three inputs, namely y0, e0, e1. An input of y0 can cause the circuit 145 to select zero, meaning the exponent of y0 will not be adjusted. An input of e0 can cause the circuit 145 to select fourteen, resulting in the exponent of e0 being adjusted to remove fourteen leading zeros. An input of e1 can cause the circuit 145 to select twenty-eight, resulting in the exponent of e1 being adjusted to remove twenty-eight leading zeros. Such defined values of the multiplexer output may allow the FPU 140 to maintain a satisfactory precision during implementation.

Note that the defined values of the multiplexer (e.g., circuit 145) can be adjusted, depending on a desired implementation of the system 100 and/or the processor 110. In another example, the processor 110 can be configured to implement the AEGP division scheme. Under the AEGP division scheme, the parameter D can converge towards a value of 1 and the parameter D can range from 0.5 to 2.0, which causes the intermediate values of D to have either no leading zero or one leading zero. Thus, the circuit 145 can include a multiplexer (MUX) operable to select between zero and one, or to select between no shift and shift by one digit or one bit.

The post-processing unit 155 in the FPU 140 can normalize a final estimated quotient $Z_{Final}$ from the last iteration performed by arithmetic unit 150, such as q2 under the NR division scheme and x3 under the AEGP division scheme. The post-processing unit 155 can include a normalizer that normalizes q2 or x3, yielding Q2 or X3, respectively. Other operations that can be performed by the post-processing unit 155 can include operations such as a back multiplication check on the final estimated quotient, rounding the final estimated quotient, and packing bits to final estimated quotient. To be described in more detail below, the post-processing unit 155 can duplicate the final estimated quotient. A first correction term β can be added to a first copy of $Z_{Final}$, generating $Z'_{Final}$, and a second correction term δ can be added a second copy of $Z_{Final}$, generating $Z^*_{Final}$. The post-processing unit 155 can perform the back multiplication check using $Z'_{Final}+\beta$. Based on a result of the back-multiplication check, the post-processing unit 155 can determine whether to round $Z^*_{Final}$, or $Z^*_{Final}$+ulp, to obtain the final quotient Z, where the final quotient Z can achieve an error less than ¼ ulp.

Figure 2:
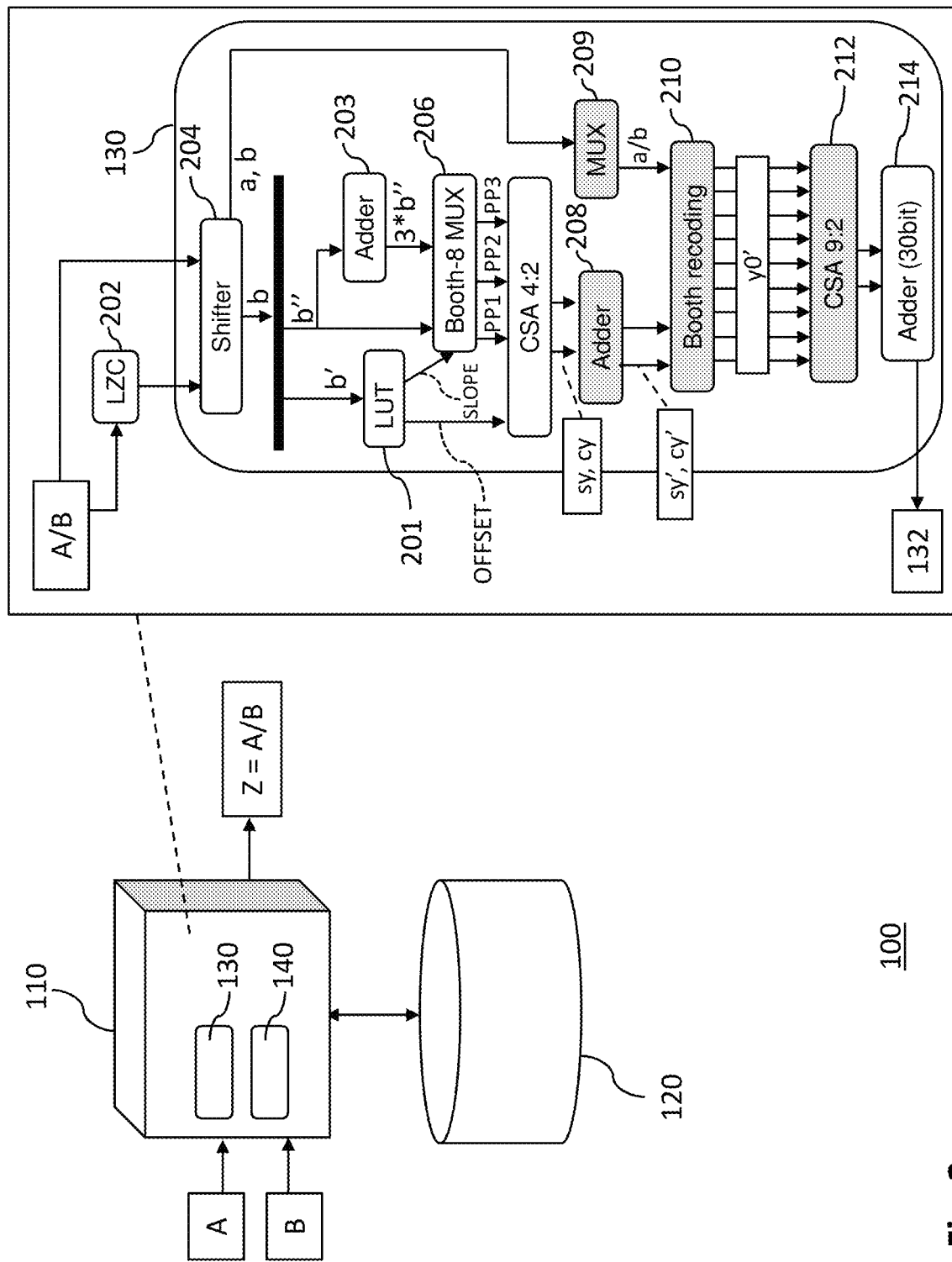
FIG. 2 is a diagram showing an example circuit that can be implemented by the example system of FIG. 1 to perform low latency floating-point division operations in one embodiment.

FIG. 2 is a diagram showing an example circuit that can be implemented by the example system of FIG. 1 to perform low latency floating-point division operations in one embodiment. FIG. 2 may include components that are labeled identically to components of FIG. 1, which are not described again for the purposes of clarity. The description of FIG. 2 may reference at least some of the components of FIG. 1.

In an example shown in FIG. 2, the circuit 130 can include a plurality of components that facilitate the initialization of D1 and X1 under the AEGP division scheme, or initialization of Q0 and E0 under the NR division scheme, using Y0' instead of Y0 (described above). The circuit 130 can be coupled to, or can include, a leading zero counter (LZC) 202 operable to count a number of leading zero bits of an input (e.g., A or B). For example, if the divisor B is being inputted to the circuit 130, the LZC 202 can count or determine a number of leading zero bits of B. A shifter 204 can shift the bits of the input A or B by the determined number of leading zeros to normalize the input (if the input requires normalization), resulting in output of normalized values a or b. The order in which the shifter 204 shifts the input A or B can be arbitrary. The shifter 204 can output the normalized values, a and b, to a multiplexer 209 (described below). The shifter can also send subsets of b to different components of the circuit 130. For example, the shifter 204 can send a subset of b, denoted as b', to a lookup table (LUT) circuit 201, and another subset of b, denoted as b", to an adder 203 and a multiplexer 206. The circuit 130 can implement the LUT circuit 201 to determine Y0=fre(b)=OFFSET+SLOPE*b', where OFFSET and SLOPE denote an offset value and a slope value of the estimate reciprocal of b, respectively. In an example, the subsets b' and b" can be relatively small (small number of bits) such that the determination of OFFSET and SLOPE can be implemented directly with logic gates (e.g., LUT 201), or can be implemented with table values that can be read from memory (e.g., memory 120). The LUT 201 can output the OFFSET to a 4:2 CSA, and can output the SLOPE to the multiplexer 206 (which can be a Booth multiplexer), where the SLOPE can be in Booth-8 recoded format (e.g., radix-8). The size of the subsets b', b", and the values (e.g., bits selected from b) of b', b", can be based on a desired implementation of the system 100. In an example, the most significant bit position of b can be position 0, the subset b' can include seven bits ranging from bit position 1-7, and the subset b" can include eleven bits ranging from bit position 6 to 16. Note that some bits among b' and b" can overlap (e.g., bit positions 6 and 7). Further, in some example embodiments, an increase in the number of bits selected for b' and b" can increase the quotient Z's accuracy.

As mentioned above, the shifter 204 can input b" into the adder 203. The adder 203 can output a sum of b" and a shifted version of b", equal to 3*b", which can be inputted into the Booth multiplexer 206. The Booth multiplexer 206 can receive three inputs: 1) the SLOPE from the LUT circuit 201, 2) b" from the shifter 204, and 3) the product 3*b", as inputs, and output three recoded partial products denoted as PP1, PP2, PP3. The Booth multiplexer 206 can perform Booth recoding on the product 3*b" output the partial products PP1, PP2, PP3 to a 4:2 CSA. The 4:2 CSA can receive the OFFSET from the LUT 201, and PP1, PP2, PP3 from the Booth multiplexer 206, as inputs. The 4:2 CSA can output sum bits (denoted as sy) and carry bits (denoted as cy) to an adder 208, where the adder 208 can be a limited carry propagation adder. The adder 208 can be implemented to insert one or more zeroes into sy and cy, resulting in coefficients sy' and cy'. The one or more zeroes can be inserted such that a sum of the coefficients sy' and cy' is equivalent to a sum of sy and cy (sy'+cy'=sy+cy). The adder 208 can output the coefficients sy' and cy' to a Booth recoder 210, where the Booth recoder 210 can be a radix-4 Booth recoder. Further, the MUX 209, which can be a 2:1 MUX, can receive the normalized values a and b, and can output a or b into the Booth recoder 210. The Booth recoder 210 can perform Booth recoding on sy' and cy', and using the outputted a or b received from the MUX 209, to generate y0'. The output of the Booth recoder 210 (y0') can include nine Booth-4 digits, and can be inputted to a 9:2 CSA 210. The 9:2 CSA 210 can be implemented with a 30-bit adder 214 to multiply y0' with A or B to initialize parameters (e.g., parameter 132). For example, under the AEGP division scheme, y0' can be multiplied with A to initialize X1, and y0' can be multiplied with B to initialize D1. By implementing components such as the adder 208, the Booth recoder 210, the 9:2 CSA 212, and the adder 214, the initialization of parameter 132 (e.g., D, X) can be absorbed into the pre-processing stage of the division pipeline. Further, circuits such as the 9:2 CSA 212 and adder 214 can be operated separately from the pipeline of FPU 140, thus reducing an amount of instruction cycles being used to perform the division A/B. In some examples, the adder 208, the Booth recoder 210, the 9:2 CSA 212, and the adder 214 can be components that are integrated into a processor configured to perform division operations, such that the processor with these integrated components can perform the initialization of parameters 132 described herein.

Figure 3A:
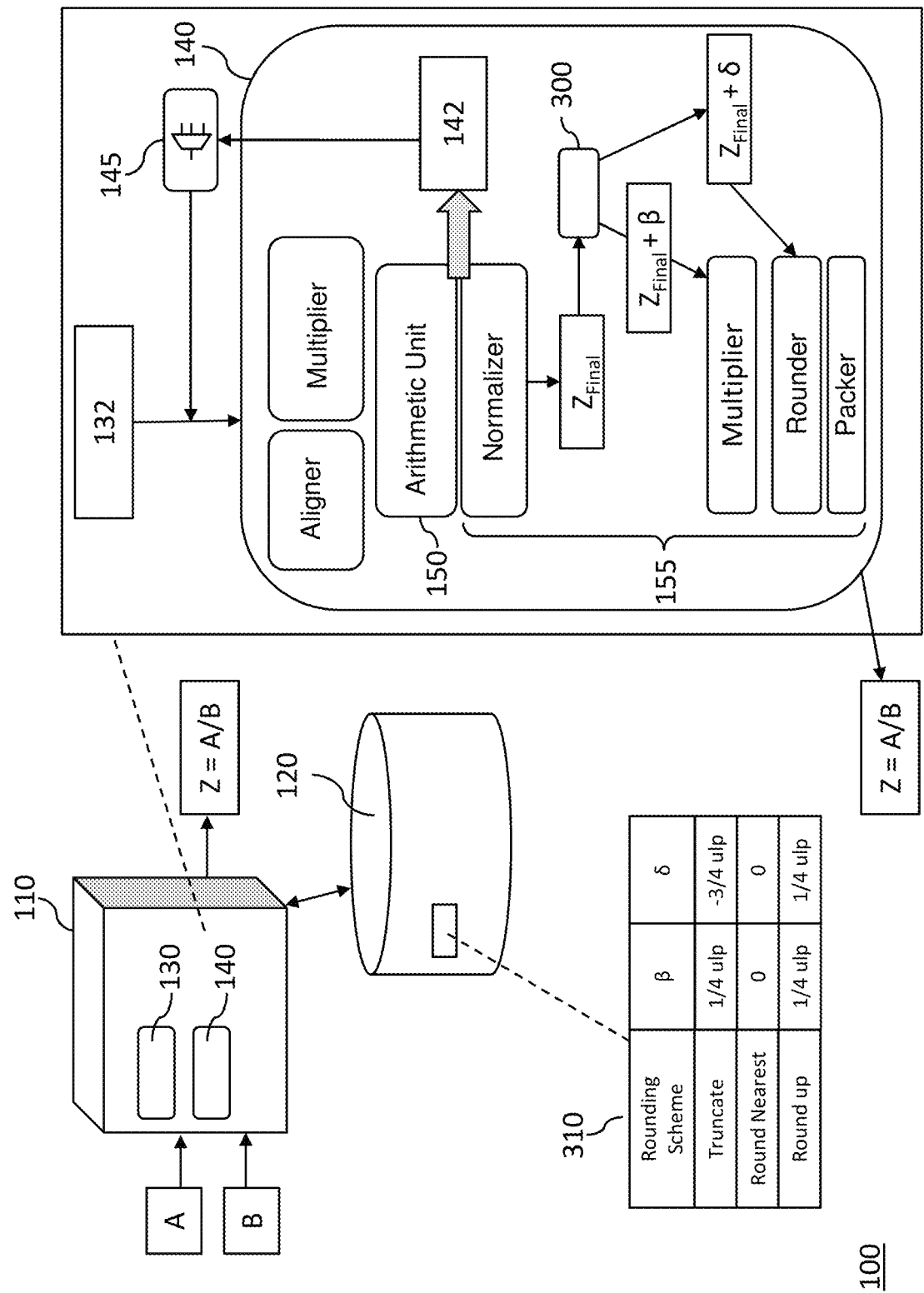
FIG. 3A is a diagram showing an example circuit that can be implemented in low latency floating-point division operations in one embodiment.

FIG. 3A is a diagram showing an example circuit that can be implemented in low latency floating-point division in one embodiment. FIG. 3A may include components that are labeled identically to components of FIGS. 1-2, which are not described again for the purposes of clarity. The description of FIG. 3A may reference at least some of the components of FIGS. 1-2.

In an example shown in FIG. 3A, the FPU 140 can include a plurality of components that facilitate refinement of the parameters 132. In an example, the FPU 140 can include components such as an aligner, one or more multipliers, the arithmetic unit 150, and the post-processing unit that includes a normalizer, a rounder, and a packer. The arithmetic unit 150 can be operable to refine parameters 132 until the final estimated quotient, denoted as $Z_{Final}$, is determined. The normalizer of the FPU 140 (or the post-processing unit 155) can normalize the final estimated quotient $Z_{Final}$ determined from a final iteration. The post-processing unit 155 can check the accuracy of $Z_{Final}$, and perform rounding and packing on the normalized result to determine the final quotient Z=A/B. To check the accuracy of $Z_{Final}$, a multiplier of the post-processing unit 155 can perform back multiplication to determine an error. For example, the final estimated quotient $Z_{Final}$ can be multiplied with the divisor B to obtain an estimation of the dividend A, denoted as A'. The estimation A' can be compared with the dividend A to determine a difference, where the determined difference can be an error denoted as ε. The value of $Z_{Final}$ can be rounded (by the rounder of the post-processing unit) based on the error to obtain the final quotient Z.

In some examples, in order to round $Z_{Final}$ to a value with improved precision, (e.g., ε<¼ ulp), a circuit 300 of the post-processing unit 155 can be configured to duplicate $Z_{Final}$, generating $Z^*_{Final}$ and $Z'_{Final}$, perform back-multiplication check using $Z^*_{Final}$, and determining whether to round $Z'_{Final}$, or to round $Z'_{Final}$ with an added rounding term, based on a result of the back-multiplication check. The values of $Z^*_{Final}$ and $Z'_{Final}$ can be based on respective correction terms selected by the circuit 300, where the selection can be based on particular rounding schemes and an objective of achieving a particular target error (e.g., an error being less than ¼ ulp, ⅛ ulp, or other errors). In an example, ¼ ulp can be 0.01, ½ ulp can be 0.10, ⅛ ulp can be 0.001, ⅜ ulp can be 0.011, etc. Thus, a number V can be denoted as V.00, and V+¼ ulp can be V.01.

In the examples presented herein, $Z^*_{Final}$=trunc($Z_{Final}$+δ) and $Z'_{Final}$=trunc($Z_{Final}$+β), where trunc( ) can be a truncate function to truncate an input. $Z'_{Final}$ can be used by the multiplier of the post-processing unit 155 to perform a back-multiplication check, such as comparing a product of $Z'_{Final}$×B with A. The result of the back-multiplication check can indicate whether the product of $Z'_{Final}$×B is greater than, equal to, or less than A, or can indicate whether $Z_{Final}$ is greater than, equal to, or less than Z. The result of the back-multiplication check can be used by the circuit 300 to select whether $Z^*_{Final}$ or $Z^*_{Final}$ ulp should be sent to a circuit (e.g., a rounder) of the post-processing unit 155. The rounder can receive the selected value ($Z^*_{Final}$ or $Z^*_{Final}$ ulp) and round the selected value to obtain the final quotient Z.

The circuit 300 can be configured to select values of the correction terms (β and δ to be added to $Z_{Final}$ to generate $Z^*_{Final}$ and $Z'_{Final}$. The selection can be based on a rounding scheme being implemented by the system 100. Some example rounding schemes can include truncate, round up, round nearest down, round nearest even, and other rounding schemes. In some examples, different values of β and δ can be stored in the memory 120. Further, mappings between the different values of β, δ and rounding schemes can be stored in the memory 120. Thus, the circuit 300 can select values of β, δ based on a rounding scheme being implemented by the system 100. For example, a table 310 stored in memory 120 can indicate mappings between different values of β, δ and different rounding schemes. If the system 100 is being implemented to truncate, the circuit 300 can set β=¼ ulp. If the system 100 is being implemented to round to a nearest even number, the circuit 300 can set β=0 ulp. If the system 100 is being implemented to round up, the circuit 300 can set β=¼ ulp. Similarly, if the system 100 is being implemented to truncate, the circuit 300 can set δ=−¾ ulp. If the system 100 is being implemented to round to a nearest even number, the circuit 300 can set δ=0 ulp. If the system 100 is being implemented to round up, the circuit 300 can set δ=¼ ulp. Note that if the system 100 is being implemented to achieve another target error, such as ⅛ ulp, the values of β and δ being stored in the memory and selectable by the circuit 300 can be different from the example values shown in table 310 in FIG. 3A. The circuit 300 can add the selected values of β and δ to $Z_{Final}$ to generate $Z'_{Final}$ and $Z^*_{Final}$, respectively.

Figure 3B:
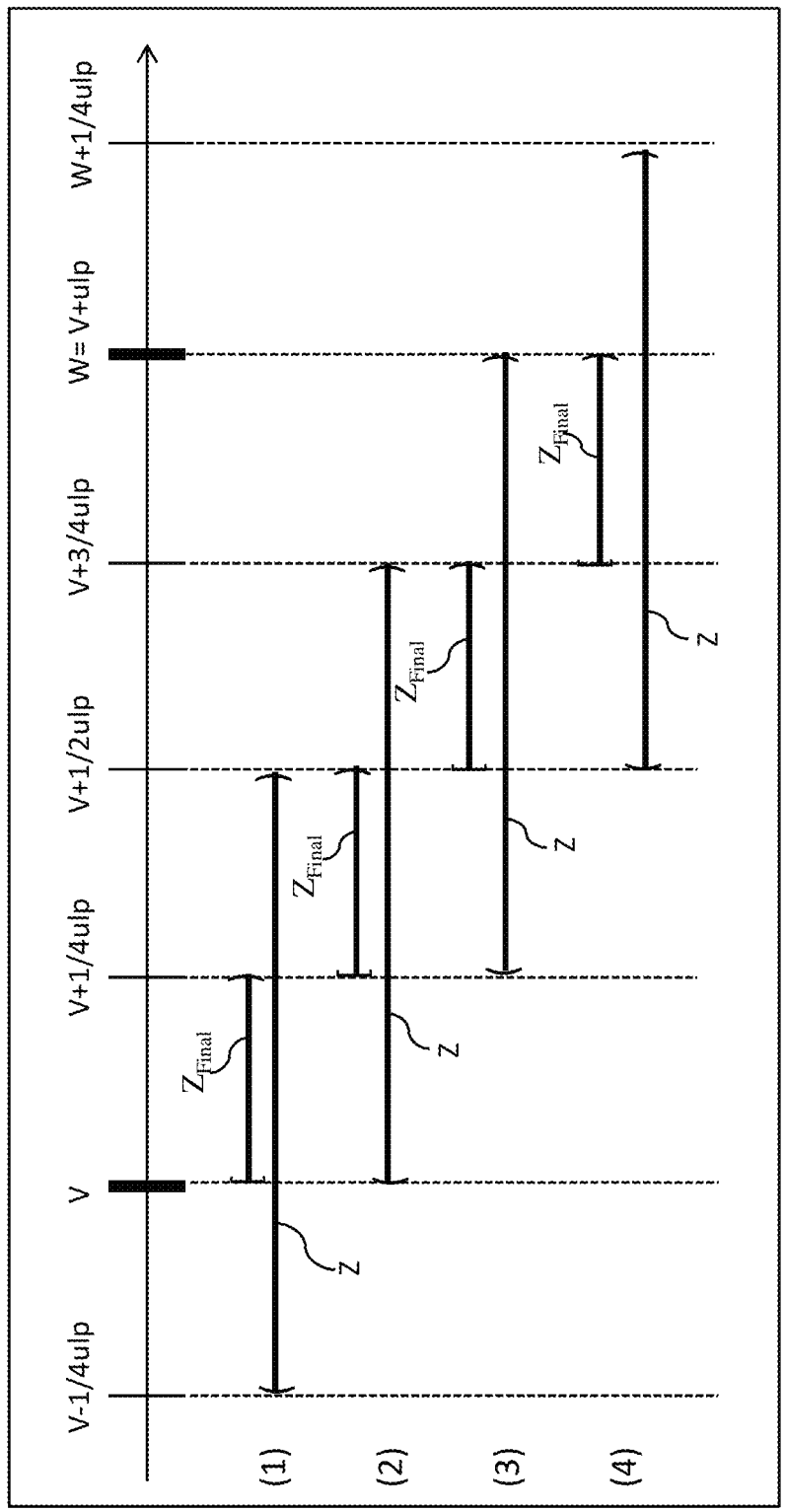
FIG. 3B is a diagram showing an example that can be implemented by the example system of FIG. 1 to perform low latency floating-point division operations in one embodiment.

FIG. 3B is a diagram showing an example that can be implemented by the example system of FIG. 1 to perform low latency floating-point division operations in one embodiment. In FIG. 3B, a diagram 330 illustrates ranges of potential values of $Z_{Final}$ and Z, and a table 340 illustrates scenarios to select either $Z^*_{Final}$ or $Z^*_{Final}$+ulp to be rounded to obtain the final quotient Z.

Focusing on diagram 330, four example scenarios are presented: (1), (2), (3), (4). In diagram 330, V and W can be floating point numbers, where W=V+ulp. The value of $Z_{Final}$ can be within a range of any two arbitrary floating point numbers, such as V and W. Thus, the scenarios (1)-(4) depict the possible values of the final quotient Z subject to a target of achieving an error ε<¼ ulp, where the possible values of the final quotient Z can be based on the value of $Z_{Final}$ (which can be within the range from V to W). In scenario (1), if a value of $Z_{Final}$ is within a range of V to V+¼ ulp, then a value of Z can be within a range of V−¼ ulp to V+½ ulp. In scenario (2), if a value of $Z_{Final}$ is within a range of V+¼ ulp to V+½ ulp, then a value of Z can be within a range of V to V+¾ ulp. In scenario (3), if a value of $Z_{Final}$ is within a range of V+½ ulp to V+¾ ulp, then a value of Z can be within a range of V+¼ ulp to W. In scenario (4), if a value of $Z_{Final}$ is within a range of V+¾ ulp to W, then a value of Z can be within a range of V+½ ulp to W+¼ ulp. In another example, if the objective is to achieve an error ε<⅛ ulp, then $Z_{Final}$ can be any value between V and W and the final quotient Z can be limited to be within the range from V−⅛ ulp to W+⅛ ulp (or up to V++9/8 ulp), and eight scenarios (where $Z_{Final}$ can be with a range of ⅛ ulp wide) can be used to determine the final quotient Z instead of four scenarios shown in diagram 330.

FIGS. 3C, 3D, 3E illustrate example results of an implementation of the example system of FIG. 1 in one embodiment. In FIG. 3C, a table 340, that can be stored in the memory 120, illustrates scenarios (1)-(4) of diagram 330 when the system 100 is configured to implement the rounding scheme of truncate. In FIG. 3D, a table 350, that can be stored in the memory 120, illustrates scenarios (1)-(4) of diagram 330 when the system 100 is configured to implement the rounding scheme of round up. In FIG. 3E, a table 360, that can be stored in the memory 120, illustrates scenarios (1)-(4) of diagram 330 when the system 100 is configured to implement the rounding scheme of round nearest. In tables 340, 350, 360, the different values of $Z'_{Final}$ and $Z^*_{Final}$, which are based on different values of β and δ, under different rounding schemes, are shown. Further, in tables 340, 350, 360, the "Round" field indicates the value that can be selected by the system 100 to be inputted into the rounder of the post-processing unit 155, and the "Result Z" field indicates the result Z, which is the final quotient, by rounding the selected value.

In an example, focusing on scenario (1) of the diagram 330 (FIG. 3B) and table 340, under the truncate rounding scheme, $Z_{Final}$ can be within the range V to V+¼ ulp. Based on $Z_{Final}$ being within the range V to V+¼ ulp, =V because $Z_{Final}+\beta$ can be within the range from V+¼ ulp to V+½ ulp. Thus, truncating $Z_{Final}+\beta$ based on $Z'_{Final}=\text{trunc}(Z_{Final}+\beta)$ can lead to $Z'_{Final}=V$. Similarly, based on $Z_{Final}$ being within the range V to V+¼ ulp, $Z^*_{Final}=V-\text{ulp}$ because $Z_{Final}+\delta$ can be within the range from V–¾ ulp to V–½ ulp. Thus, truncating $Z_{Final}+\delta$ based on $Z^*_{Final}=\text{trunc}(Z_{Final}+\delta)$ can lead to $Z^*_{Final}=V-\text{ulp}$. The circuit 300 of the post-processing unit 155 can compare a product $Z'_{Final}*B$ with the dividend A. In scenario (1) of table 340, if the product is less than or equal to A, the circuit 300 can select the value $Z^*_{Final}+\text{ulp}$ to be inputted into the rounder of the post-processing unit 155. The rounder can round (in this scenario, truncate because the system is configured to implement the truncate rounding scheme) the input $Z^*_{Final}+\text{ulp}$, such as $\text{trunc}(Z^*_{Final}+\text{ulp})=\text{trunc}(V-\text{ulp}+\text{ulp})=\text{trunc}(V)=V$. The circuit 300 can thus set V as the final quotient Z. Further, in scenario (1) of table 340, if the product is greater than A, the circuit 300 can select the value $Z^*_{Final}+0$ (or simply $Z^*_{Final}$) to be inputted into the rounder of the post-processing unit 155. The rounder can round the input $Z^*_{Final}$ by performing $\text{trunc}(Z^*_{Final})=\text{trunc}(V-\text{ulp})$, yielding Z=V–ulp.

In scenarios (2) and (3) of the diagram 330 (FIG. 3B) and table 340, under the truncate rounding scheme, $Z_{Final}$ can be within the ranges V+¼ ulp to V+½ ulp and V+½ ulp to V+¾ ulp, respectively. Thus, $Z'_{Final}=V$ for both scenarios (2) and (3) because $Z_{Final}+\beta$ can be within the ranges from V+½ ulp to V+¾ ulp and V+¾ ulp to V+ulp, respectively. Similarly, $Z^*_{Final}=V-\text{ulp}$ because $Z_{Final}+\delta$ can be within the ranges V–½ ulp to V–¼ ulp and from V–¼ ulp to V, respectively. In scenarios (2) and (3) of table 340, the circuit 300 can select the value $Z^*_{Final}$ ulp to be inputted into the rounder of the post-processing unit 155 regardless of whether the product $Z'_{Final}*B$ is less than, equal to, or greater than A. As a result, the value $Z^*_{Final}+\text{ulp}$ can be selected and inputted into the rounder, yielding Z=V.

In scenario (4) of the diagram 330 (FIG. 3B) and table 340, under the truncate rounding scheme, $Z_{Final}$ can be within the ranges V+¾ ulp to V. Thus, $Z'_{Final}=V+\text{ulp}$ because $Z_{Final}+\beta$ can be within the ranges from V+ulp (or W) to W+¼ ulp. Similarly, $Z^*_{Final}=V$ because $Z_{Final}+\delta$ can be within the range V to V+¼ ulp. In scenario (4) of table 340, the circuit 300 can select the value $Z^*_{Final}$ ulp to be inputted into the rounder of the post-processing unit 155 when the product $Z'_{Final}*B$ is less than or equal to A, which leads to rounding $Z^*_{Final}$ ulp to yield Z=V+ulp. Further, in scenario (4) of table 340, the circuit 300 can select the value $Z^*_{Final}$ to be inputted into the rounder of the post-processing unit 155 when the product $Z'_{Final}*B$ is greater than A, which leads to rounding $Z^*_{Final}$ to yield Z=V.

In an example, focusing on scenario (1) of the diagram 330 (FIG. 3B) and table 350, under the round up scheme, $Z_{Final}$ can be within the range V to V+¼ ulp. Based on $Z_{Final}$ being within the range V to V+¼ ulp, $Z'_{Final}=V$ because $Z_{Final}+\beta$ can be within the range from V+¼ ulp to V+½ ulp. Thus, truncating $Z_{Final}+\beta$ based on $Z'_{Final}=\text{trunc}(Z_{Final}+\beta)$ can lead to $Z'_{Final}=V$. Similarly, based on $Z_{Final}$ being within the range V to V+¼ ulp, $Z^*_{Final}=V$ because $Z_{Final}+\delta$ can be within the range from V+¼ ulp to V+½ ulp. Thus, truncating $Z_{Final}+\delta$ based on $Z^*_{Final}=\text{trunc}(Z_{Final}+\delta)$ can lead to $Z^*_{Final}=V$. The circuit 300 of the post-processing unit 155 can compare a product $Z'_{Final}*B$ with the dividend A. In scenario (1) of table 350, if the product is less than A, the circuit 300 can select the value $Z^*_{Final}+\text{ulp}$ to be inputted into the rounder of the post-processing unit 155. The rounder can round (in this scenario, round up because the system is configured to implement the round up scheme) the input $Z^*_{Final}+\text{ulp}$, such as round-up $(Z^*_{Final}+\text{ulp})=\text{round-up}(V+\text{ulp})=V+\text{ulp}$. The circuit 300 can thus set V+ulp as the final quotient Z. Further, in scenario (1) of table 340, if the product is greater than or equal to A, the circuit 300 can select the value $Z^*_{Final}+0$ (or simply $Z^*_{Final}$) to 1 be inputted into the rounder of the post-processing unit 155. The rounder can round up the input $Z^*_{Final}$ to obtain Z=V.

In scenarios (2) and (3) of the diagram 330 (FIG. 3B) and table 350, under the round up scheme, $Z_{Final}$ can be within the ranges V+¼ ulp to V+½ ulp and V+½ ulp to V+¾ ulp, respectively. Thus, $Z'_{Final}=V$ and $Z^*_{Final}=V$ for both scenarios (2) and (3) because both $Z_{Final}+\beta$ and $Z_{Final}+\delta$ can be within the ranges from V+½ ulp to V+¾ ulp and V+¾ ulp to V+ulp, respectively. In scenarios (2) and (3) of table 340, the circuit 300 can select the value $Z^*_{Final}+\text{ulp}$ to be inputted into the rounder of the post-processing unit 155 regardless of whether the product $Z'_{Final}*B$ is less than, equal to, or greater than A. As a result, the value $Z^*_{Final}+\text{ulp}$ can be selected and inputted into the rounder, where round up of $Z^*_{Final}$ ulp yields Z=V+ulp.

In scenario (4) of the diagram 330 (FIG. 3B) and table 350, under the round up scheme, $Z_{Final}$ can be within the ranges V+¾ ulp to V. Thus, $Z'_{Final}=V+\text{ulp}$ and $Z^*_{Final}=V+\text{ulp}$ because both $Z_{Final}+\beta$ and $Z_{Final}+\delta$ can be within the range from V+ulp (or W) to W+¼ ulp. In scenario (4) of table 350, the circuit 300 can select the value $Z^*_{Final}$ ulp to be inputted into the rounder of the post-processing unit 155 when the product $Z'_{Final}*B$ is less than A, which leads to round-up $(Z^*_{Final}+\text{ulp})$ being V+2 ulp (or W+ulp) because $Z^*_{Final}=V+\text{ulp}$. Further, in scenario (4) of table 350, the circuit 300 can select the value $Z^*_{Final}$ to be inputted into the rounder of the post-processing unit 155 when the product $Z'_{Final}*B$ is greater than or equal to A, which leads to round-up $(Z^*)$ yielding Z=V+ulp.

In an example, focusing on the diagram 330 (FIG. 3B) and table 360, under the round nearest scheme, $Z'_{Final}=\text{trunc}(Z_{Final}+\beta)+\frac{1}{2}$ ulp, which leads to $Z'_{Final}=V+\frac{1}{2}$ ulp. $Z^*_{Final}$ remains as $\text{trunc}(Z_{Final}+\delta)$, and thus, $Z^*_{Final}=V$. The circuit 300 of the post-processing unit 155 can compare a product $Z'_{Final}*B$ with the dividend A. In scenario (1) of table 360, the circuit 300 can select the value $Z^*_{Final}$ to be inputted into the rounder of the post-processing unit 155 regardless of whether the product $Z'_{Final}*B$ is less than, equal to, or greater than A. As a result, the value $Z^*_{Final}$ can be selected and inputted into the rounder, where round nearest (round nearest even, or round nearest down) of $Z^*_{Final}$ yields Z=V.

In scenario (4) of the diagram 330 (FIG. 3B) and table 360, under the round nearest scheme, $Z_{Final}$ can be within the ranges V+¾ ulp to V. Similar to scenario (1), $Z'_{Final}=\text{trunc}(Z_{Final}+\beta)+\frac{1}{2}$ ulp, which leads to $Z'_{Final}=V+\frac{1}{2}$ ulp. $Z^*_{Final}$ remains as $\text{trunc}(Z_{Final}+\delta)$, and thus, $Z^*_{Final}=V$. The circuit 300 of the post-processing unit 155 can compare a product $Z'_{Final}*B$ with the dividend A. In scenario (4) of table 360, the circuit 300 can select the value $Z^*_{Final}+\text{ulp}$ to be inputted into the rounder of the post-processing unit 155 regardless of whether the product $Z'_{Final}*B$ is less than, equal to, or greater than A. As a result, the value $Z^*_{Final}+\text{ulp}$ can be selected and inputted into the rounder, where round nearest (round nearest even, or round nearest down) of $Z^*_{Final}+\text{ulp}$ yields Z=V+ulp.

In scenarios (2) and (3) of the diagram 330 (FIG. 3B) and table 360, under the round nearest scheme, $Z_{Final}$ can be within the ranges V+¼ ulp to V+½ ulp and V+½ ulp to V+¾ ulp, respectively. Similar to scenarios (1) and (4), $Z'_{Final}$=trunc($Z_{Final}$+β)+½ ulp, which leads to $Z'_{Final}$=V+½ ulp. $Z^*_{Final}$ remains as trunc($Z_{Final}$+δ), and thus, $Z^*_{Final}$=V. The circuit 300 of the post-processing unit 155 can compare a product $Z'_{Final}$*B with the dividend A. In scenarios (2) and (3) of table 360, the circuit 300 can select the value $Z^*_{Final}$+ulp to be inputted into the rounder of the post-processing unit 155 when the product $Z'_{Final}$*B is less than A. As a result, the value $Z^*_{Final}$+ulp can be selected and inputted into the rounder, where round nearest (round nearest even, or round nearest down) of $Z^*_{Final}$+ulp yields Z=V+ulp. Further, in scenarios (2) and (3) of table 360, the circuit 300 can select the value $Z^*_{Final}$+0 to be inputted into the rounder of the post-processing unit 155 when the product $Z'_{Final}$*B is greater than A. As a result, the value $Z^*_{Final}$ can be selected and inputted into the rounder, where round nearest (round nearest even, or round nearest down) of $Z^*_{Final}$ yields Z=V.

Further, in scenarios (2) and (3) of table 360, the circuit 300 can select a value $Z^*_{Final}$+inc to be inputted into the rounder of the post-processing unit 155 when the product $Z'_{Final}$*B is equal to A. As a result, the value $Z^*_{Final}$+inc can be selected and inputted into the rounder. The value of the term inc can be '0' under the condition that the system 100 is configured to implement a round nearest even scheme and V is an odd number. When inc=0, rounding $Z^*_{Final}$ to the nearest even number yields V*=V+ulp. The value of the term inc can be '1', or "1 ulp", under the condition that the system 100 is configured to implement a round nearest even scheme and V is an even number. When inc=1, rounding $Z^*_{Final}$+ulp to the nearest even number yields V*=V. The value of the term inc can also be '1', or "1 ulp", under the condition that the system 100 is configured to implement a round nearest down scheme, regardless of whether V is an even or odd number. When inc=1, rounding $Z^*_{Final}$+ulp to the nearest down number yields V*=V. The circuit 300 can set the value V* as the final quotient Z.

Figure 4:
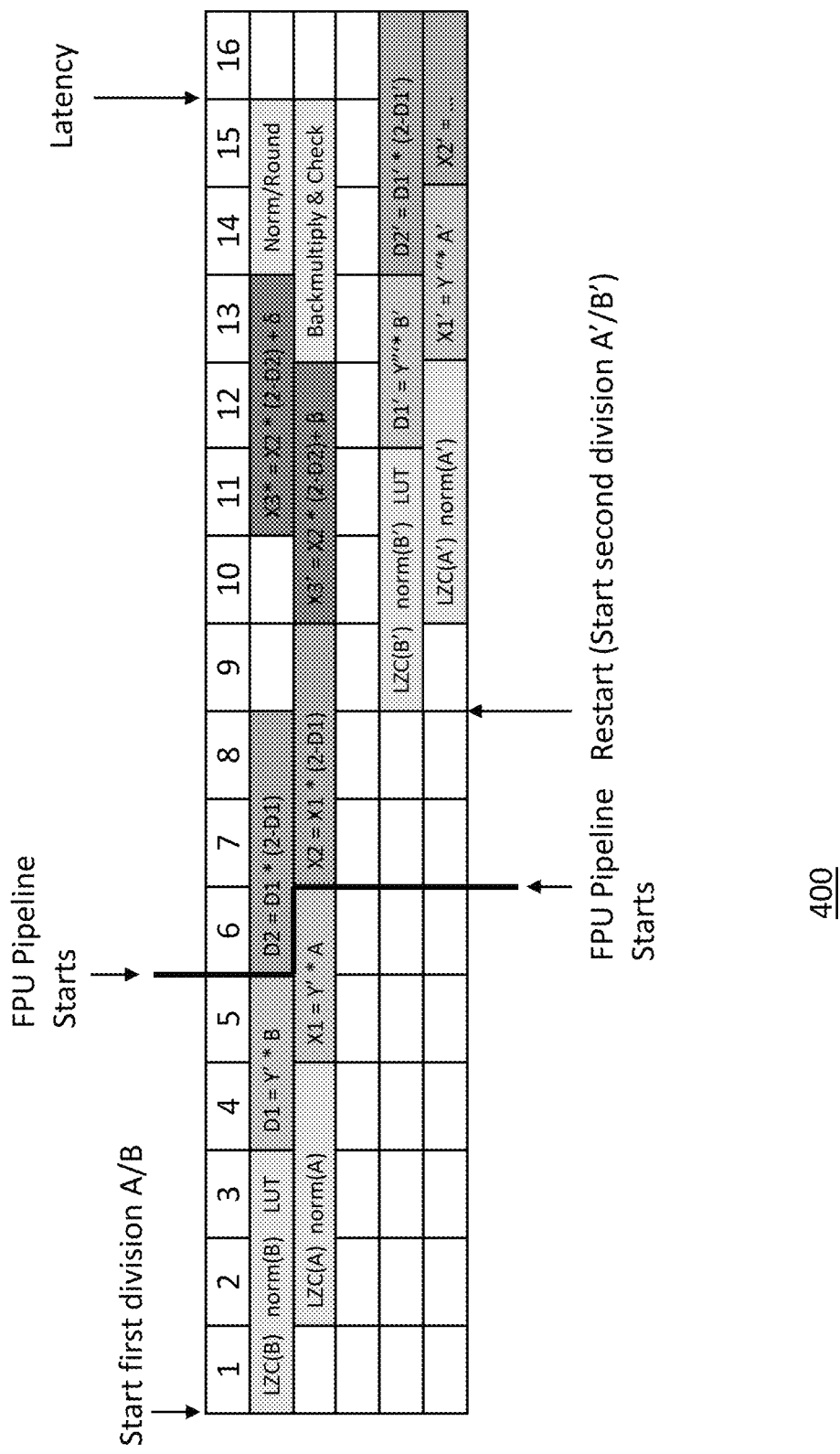
FIG. 4 is a diagram showing an example pipeline associated with an implementation of low latency floating-point division operations in one embodiment.

FIG. 4 is a diagram showing an example pipeline associated with an implementation of low latency floating-point division in one embodiment. FIG. 4 may include components that are labeled identically to components of FIGS. 1-3E, which are not described again for the purposes of clarity. The description of FIG. 4 may reference at least some of the components of FIGS. 1-3E.

In an example shown in FIG. 4, a division operation can start at cycle 1 and end at cycle 15, and a second division can start at cycle 9. At cycle 1, a first circuit (e.g., circuit 130 of the system 100 described herein) can implement a leading zero counter (LZC) to count leading zeros of a divisor B. At cycle 2, the first circuit can normalize B based on a result from cycle 1, and can implement the LZC on a dividend A to determine a number of leading zeros in A. The normalization of B and the implementation of the LZC on A in cycle 2 can be performed in parallel since different hardware components can be used in each operation. At cycle 3, the first circuit can determine Y based on the normalized B, where Y is an estimated reciprocal of B, and can normalize A based on the LZC results from cycle 2. The lookup operation and the normalization of A can be performed in parallel since different hardware components can be used in each operation. At cycles 4 to 5, the first circuit can initialize parameters (e.g., parameters 132), such as the parameter D under the AEGP division scheme by performing the multiplication Y*B, initializing D1. At cycles 5 to 6, the first circuit can also initialize X by performing the multiplication Y*A, initializing X1. At least a portion of the initialization of D and X can be performed in parallel, such as shown by the overlapped cycle 5 in the division pipeline.

An FPU pipeline can begin at cycle 6, where the FPU pipeline can perform a first iteration of operations in cycles 6-9, and a second iteration of operations in cycles 10-13. Note that the initialization of the parameters D and X, from cycles 1-6, is performed separately from the FPU pipeline. A second circuit (e.g., FPU 140 of the system 100 described herein) can perform the first iteration of operations in cycles 6-9 to refine the initialized parameters, such as D and X, into D2 and X2, respectively. The second circuit (e.g., FPU 140 of the system 100 described herein) can also perform the second iteration of operations performed in cycles 10-13 to refine the unnormalized version of X2 into a final estimated quotient X3. At cycle 9, due to the completion of determining D2, the first circuit can start the second division, where A' is a dividend of the second division and B' is the divisor of the second division. The first circuit can start the second division at cycle 9 as the second circuit may no longer need to use D1 and X1 in response to completing the generation of D2 and X2.

A post processing stage of the division pipeline can be implemented from cycle 13 to 15. At cycle 11, a third circuit (e.g., circuit 300 of the system 100 described herein) can duplicate a final estimated quotient, such as X3 determined from the last iteration from cycle 10-12. The third circuit can add correction terms to the two copies of the final estimated quotient. The third circuit can select, for example, X' to undergo a back multiplication check, and determined whether X* or X* with an added rounding term should undergo rounding to obtain the final quotient. As a result of completing the initialization stage (e.g., looking and initializing D and X) from cycles 1-3, completing the refinement stage from cycles 4 to 12, and performing the back multiplication check and the rounding in cycles 13 to 15, the first division can be completed in 15 cycles, and the system 100 can restart after 8 cycles to perform the second division at cycle 9.

Figure 5:
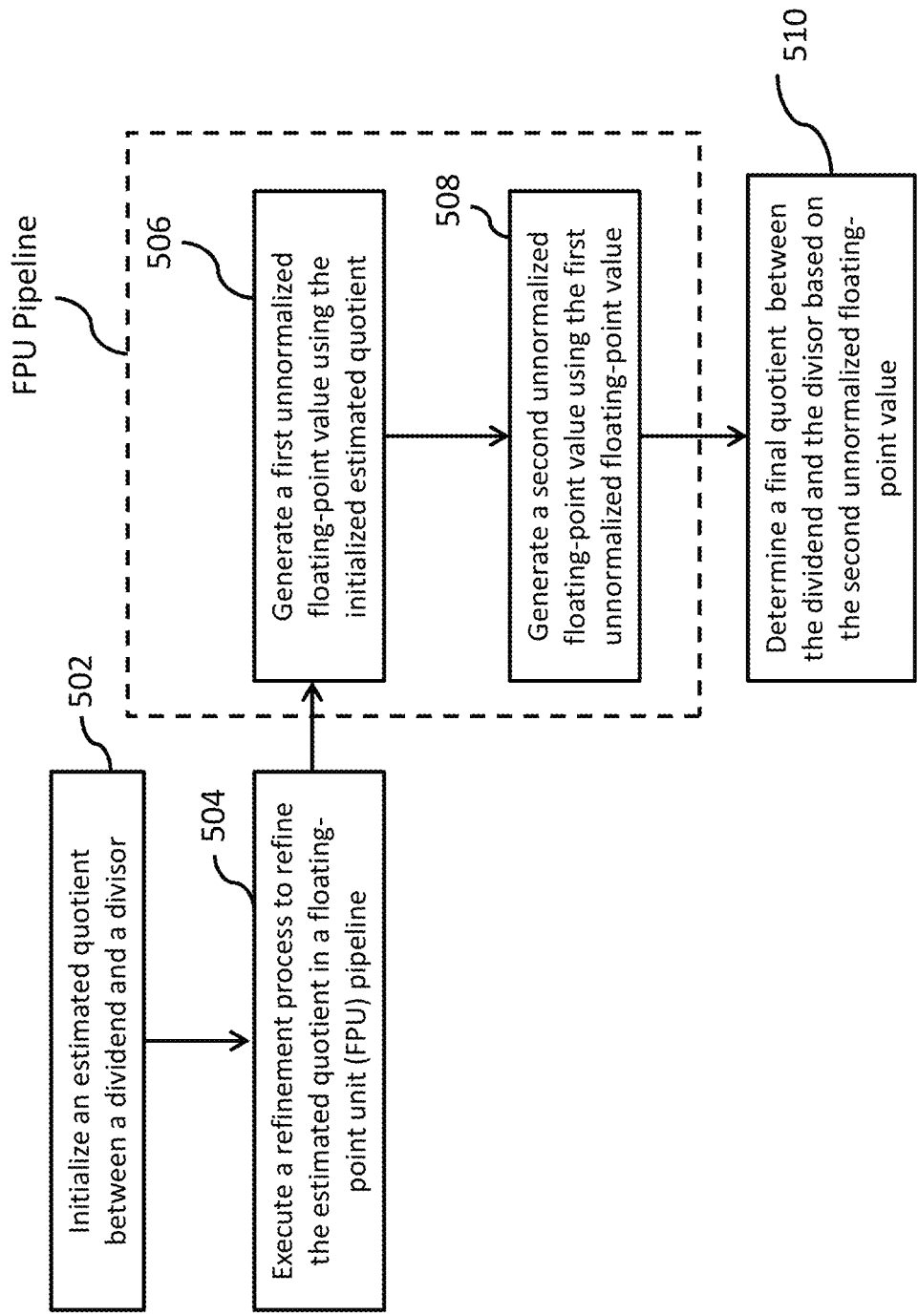
FIG. 5 is a flow diagram illustrating a process that can be performed by a processor to implement low latency floating-point division operations in one embodiment.

FIG. 5 is a flow diagram illustrating a process 500 that can be performed by a processor to implement low latency floating-point division operations in one embodiment. An example process may include one or more operations, actions, or functions as illustrated by one or more of blocks 502, 504, 506, and/or 508. Although illustrated as discrete blocks, various blocks may be divided into additional blocks, combined into fewer blocks, eliminated, or performed in parallel, depending on the desired implementation.

The process 500 can begin at block 502, where a processor can initialize an estimated quotient between a dividend and a divisor. The initialization can be performed separately from a floating-point unit (FPU) pipeline. The processor can input a sum component and a carry component of an estimated reciprocal of the divisor into a carry-save adder (CSA). The processor can perform Booth recoding on an output from the CSA, where the output can be based on the sum component and the carry component. The processor can initialize the estimated quotient using the Booth recoded output, the dividend, and the divisor. For example, the processor can multiply the Booth recoded output with the dividend to initialize the parameter, and can multiply the Booth recoded output with the divisor to initialize another parameter.

The process 500 can continue from block 502 to block 504. At block 504, the processor can execute the FPU pipeline to refine the estimated quotient. The FPU pipeline can include at least a first iteration of operations and a second iteration of operations. The process 500 can continue from block 504 to block 506. At block 506, the processor can perform the first iteration of operations to generate a first unnormalized floating-point value using the initialized estimated quotient. The process 500 can continue from block 506 to block 508. At block 508, the processor can perform the second iteration of operations to generate a second unnormalized floating-point value using the first unnormalized floating-point value. For example, the processor can perform a fixed shift on the first unnormalized floating-point value to remove at least one leading zero among the first unnormalized floating-point value to generate the second unnormalized floating-point value. A number of leading zeros to remove using the fixed shift can be based on a division scheme being implemented by the processor.

The process 500 can continue from block 508 to block 510. At block 510, the processor can determine a final quotient based on the second unnormalized floating-point value. In some examples, the processor can normalize the second unnormalized floating-point value to generate a final estimated quotient. The processor can add a first value to the final estimated quotient to generate a first final estimated quotient and can add a second value to the final estimated quotient to generate a second final estimated quotient. The first value and the second value can be based on a rounding scheme being implemented by the processor. The processor can determine a product between the first final estimated quotient and the divisor. The processor can compare the product with the dividend, and based on a result of the comparison, select a value between the second final estimated quotient and a sum of the second final estimated quotient with an added rounding term. The processor can round the selected value to determine the final quotient.

In some examples, a computer program product including a computer readable storage medium having program instructions embodied therewith, can be used to implement the process 500 shown in FIG. 5. The program instructions may be executable by a processor (e.g., processor 110) of a device to cause the device to perform one or more blocks among the process 500 shown in FIG. 5. For example, the program instructions may be executable by a processor (e.g., processor 110) of a device to cause the device to 1) initialize an estimated quotient between a dividend and a divisor, wherein the initialization can be performed separately from a floating-point unit (FPU) pipeline; 2) execute the FPU pipeline to refine the estimated quotient, where the FPU pipeline can include at least a first iteration of operations and a second iteration of operations. The refining can include i) in the first iteration of operations, generating a first unnormalized floating-point value using the initialized estimated quotient, and ii) in the second iteration of operations, generating a second unnormalized floating-point value using the first unnormalized floating-point value. The program instructions may be further executable by the processor of the device to cause the device to determine a final quotient based on the final estimated quotient.

Figure 6:
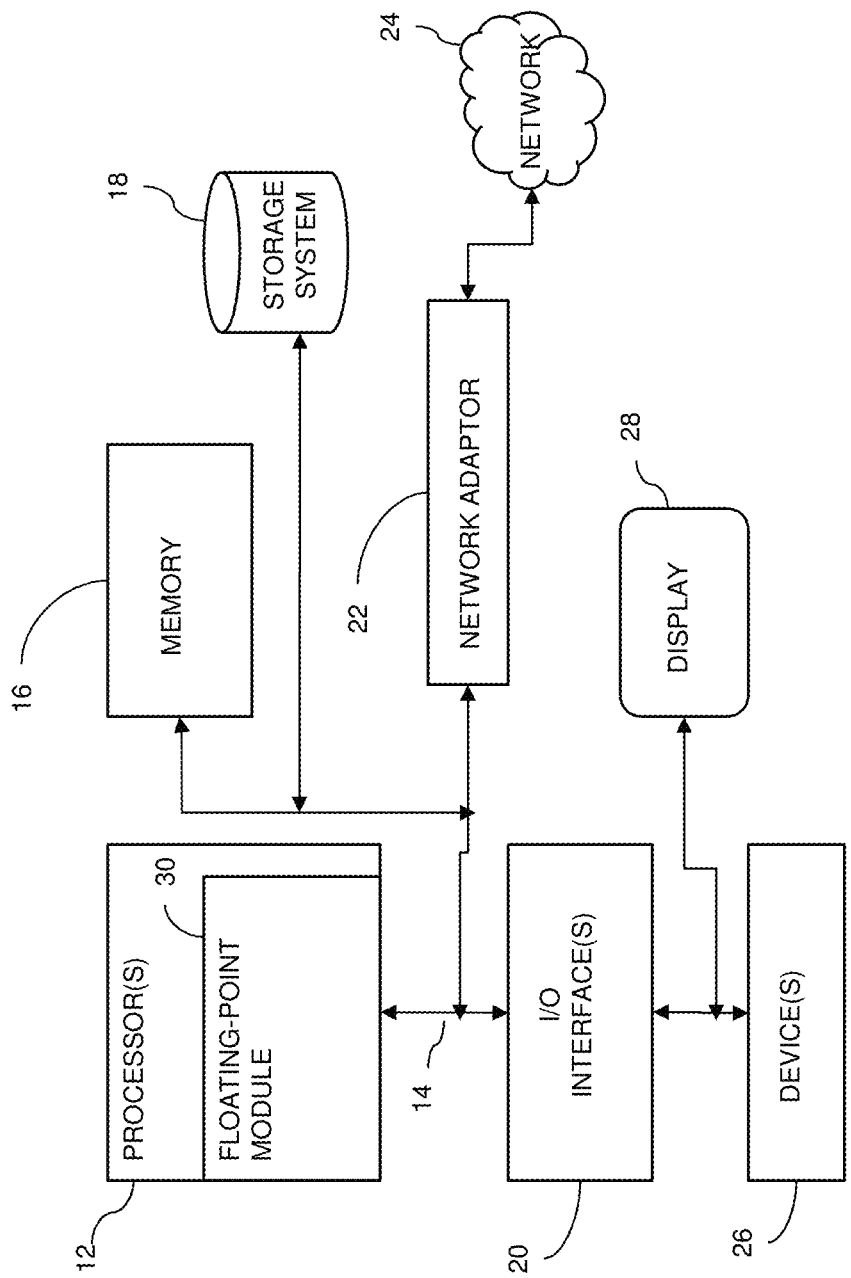
FIG. 6 illustrates a schematic of an example computer or processing system that may implement low latency floating-point division operations in one embodiment.

FIG. 6 illustrates a schematic of an example computer or processing system that may implement low latency floating-point division operations in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., floating-point module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuit, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuit including, for example, programmable logic circuit, field-programmable gate arrays (FPGA), or programmable logic arrays (PLA) may execute the computer readable program instructions by utilizing state information of the computer readable program instructions to personalize the electronic circuit, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
   a memory;
   a processor configured to be in communication with the memory, wherein:
      the processor comprises a circuit including logic gates, and a separate floating-point unit (FPU);
      the circuit of the processor is configured to initialize an estimated quotient between a dividend and a divisor;
      the FPU of the processor is configured to receive the estimated quotient from the circuit and execute a refinement process to refine the estimated quotient in a FPU pipeline, the FPU pipeline including at least a first iteration of operations and a second iteration of operations, the refinement process comprises:
         in the first iteration of operations, generating a first unnormalized floating-point value using the initialized estimated quotient;
         in the second iteration of operations, generating a second unnormalized floating-point value using the first unnormalized floating-point value; and
      the separate FPU of the processor is further configured to determine a final quotient between the dividend and the divisor based on the second unnormalized floating-point value.

2. The system of claim 1, wherein the processor is configured to:
   input a sum component and a carry component of an estimated reciprocal of the divisor into a carry-save adder (CSA);
   perform Booth recoding on an output from the CSA, wherein the output is based on the sum component and the carry component;
   wherein the initialization of the estimated quotient is performed using the Booth recoded output, the dividend, and the divisor.

3. The system of claim 2, wherein the processor is configured to multiply the Booth recoded output with the dividend to initialize the estimated quotient, and multiply the Booth recoded output with the divisor to initialize another estimated quotient.

4. The system of claim 1, wherein the processor is configured to perform a fixed shift on the first unnormalized floating-point value to remove at least one leading zero among the first unnormalized floating-point value to generate the second unnormalized floating-point value.

5. The system of claim 4, wherein a number of leading zeros to remove using the fixed shift is based on a division scheme being implemented by the processor.

6. The system of claim 1, wherein the processor is configured to normalize the second unnormalized floating-point value.

7. The system of claim 1, wherein the processor is configured to:
   add a first value to a final estimated quotient to generate a first final estimated quotient, the final estimated quotient being an normalized value of the second unnormalized floating-point value;
   add a second value to the final estimated quotient to generate a second final estimated quotient;
   determine a product between the first final estimated quotient and the divisor;
   compare the product with the dividend;
   based on a result of the comparison, select a value between the second final estimated quotient and a sum of the second final estimated quotient with an added rounding term; and
   round the selected value to determine the final quotient.

8. The system of claim 7, wherein the processor is configured to select the first value and the second value based on a rounding scheme being implemented by the processor.

9. The system of claim 1, wherein the FPU pipeline comprises at least a first iteration of operations and a second iteration of operations, and the refinement process comprises:
   in the first iteration of operations, generating a first unnormalized floating-point value using the initialized estimated quotient;
   in the second iteration of operations, generating a second unnormalized floating-point value using the first unnormalized floating-point value, wherein the outcome of the FPU pipeline is the second unnormalized floating-point value;
   the processor is configured to:
      normalize the second unnormalized floating-point value to generate a final estimated quotient;
      perform a back-multiplication check using a first copy of the final estimated quotient;
      round a second copy of the final estimated quotient based on a result of the back-multiplication check; and
   set the rounded result as the final quotient.

10. A computer-implemented method comprising:
   initializing, by a circuit integrated in a processor, an estimated quotient between a dividend and a divisor;
   receiving, by a separate floating-point unit (FPU) of the processor, the estimated quotient from the circuit;
   executing, by the separate floating-point unit (FPU) of the processor, a refinement process to refine the estimated quotient in FPU pipeline, the FPU pipeline including at least a first iteration of operations and a second iteration of operations, the refinement process comprises:
      in the first iteration of operations, generating, by the processor, a first unnormalized floating-point value using the initialized estimated quotient;
      in the second iteration of operations, generating, by the processor, a second unnormalized floating-point value using the first unnormalized floating-point value; and
      determining, by the separate FPU of the processor, a final quotient between the dividend and the divisor based on the second unnormalized floating-point value.

11. The computer-implemented method of claim 10, further comprising:
   inputting, by the processor, a sum component and a carry component of an estimated reciprocal of the divisor into a carry-save adder (CSA);
   performing, by the processor, Booth recoding on an output from the CSA, wherein the output is based on the sum component and the carry component;
   wherein initializing the estimated quotient comprises using the Booth recoded output, the dividend, and the divisor.

12. The computer-implemented method of claim 11, further comprising:
   multiplying, by the processor, the Booth recoded output with the dividend to initialize the estimated quotient; and
   multiplying, by the processor, the Booth recoded output with the divisor to initialize another estimated quotient.

13. The computer-implemented method of claim 10, further comprising performing, by the processor, a fixed shift on the first unnormalized floating-point value to remove at least one leading zero among the first unnormalized floating-point value to generate the second unnormalized floating-point value.

14. The computer-implemented of claim 13, wherein a number of leading zeros to remove using the fixed shift is based on a division scheme being implemented by the processor.

15. The computer-implemented method of claim 10, further comprising normalizing, by the processor, the second unnormalized floating-point value.

16. The computer-implemented method of claim 10, further comprising:
   adding, by the processor, a first value to a final estimated quotient to generate a first final estimated quotient, the final estimated quotient being a normalized value of the second unnormalized floating-point value;
   adding, by the processor, a second value to the final estimated quotient to generate a second final estimated quotient;
   determining, by the processor, a product between the first final estimated quotient and the divisor;
   comparing, by the processor, the product with the dividend;
   based on a result of the comparison, selecting, by the processor, a value between the second final estimated quotient and a sum of the second final estimated quotient with an added rounding term; and
   rounding, by the processor, the selected value to determine the final quotient.

17. The computer-implemented method of claim 16, further comprising selecting, by the processor, the first value and the second value based on a rounding scheme being implemented by the processor.

18. A system comprising:
   a memory;
   a processor configured to be in communication with the memory, wherein:
      the processor comprises a circuit including logic gates, and a floating-point unit (FPU);
      the circuit of the processor is configured to initialize an estimated quotient between the dividend and the divisor;
      the FPU of the processor is configured to:
         receive the estimated quotient from the circuit;
         execute a refinement process to refine the estimated quotient in a floating-point unit (FPU) pipeline; and
         determine a final quotient based on an outcome of the refinement process,
      wherein the refinement process comprises generating at least one unnormalized floating-point value based on the initialized estimated quotient.

19. The system of claim 18, wherein the processor is configured to:
   input a sum component and a carry component of an estimated reciprocal of the divisor into a carry-save adder (CSA);
   perform Booth recoding on an output from the CSA, wherein the output is based on the sum component and the carry component;
   wherein the initialization of the estimated quotient is performed using the Booth recoded output, the dividend, and the divisor.

20. The system of claim 19, wherein the processor is configured to multiply the Booth recoded output with the dividend to initialize the estimated quotient, and multiply the Booth recoded output with the divisor to initialize another estimated quotient.

* * * * *